Sept. 24, 1935.  H. J. HARTLEY ET AL  2,015,474
INDICATING INSTRUMENT
Filed May 3, 1934   2 Sheets-Sheet 1
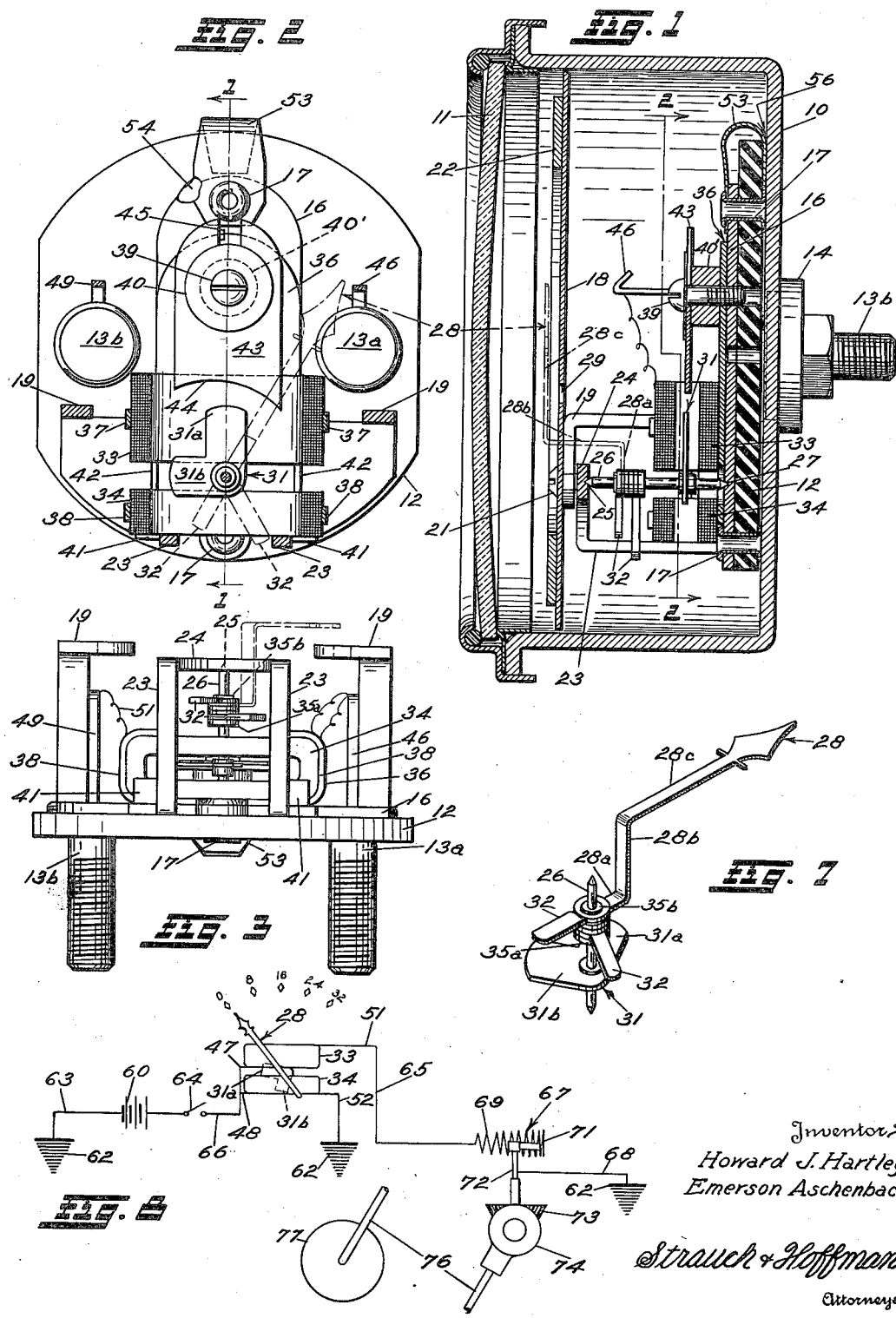
Inventors
Howard J. Hartley
Emerson Aschenbach
Strauch & Hoffman
Attorneys Sept. 24, 1935.                H. J. HARTLEY ET AL                2,015,474
                                INDICATING INSTRUMENT
                              Filed May 3, 1934         2 Sheets-Sheet 2
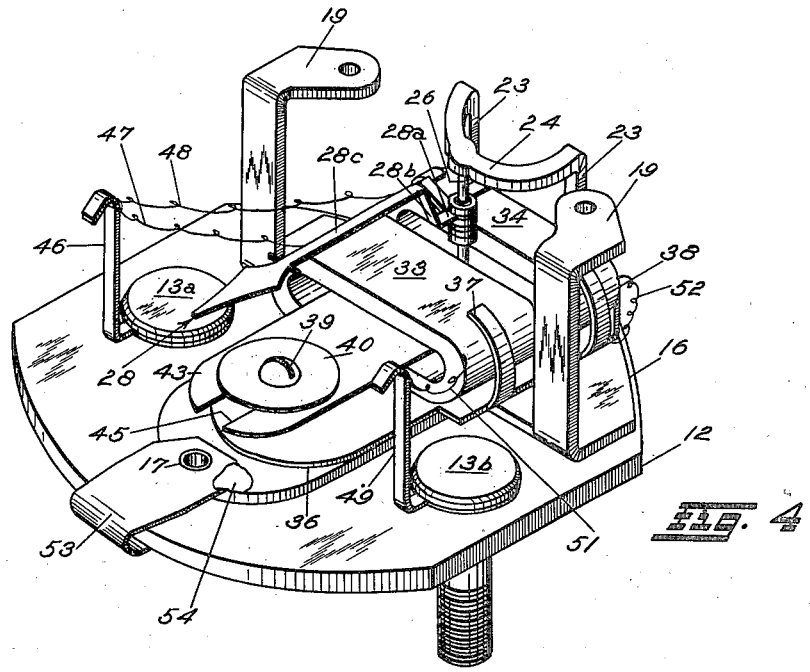
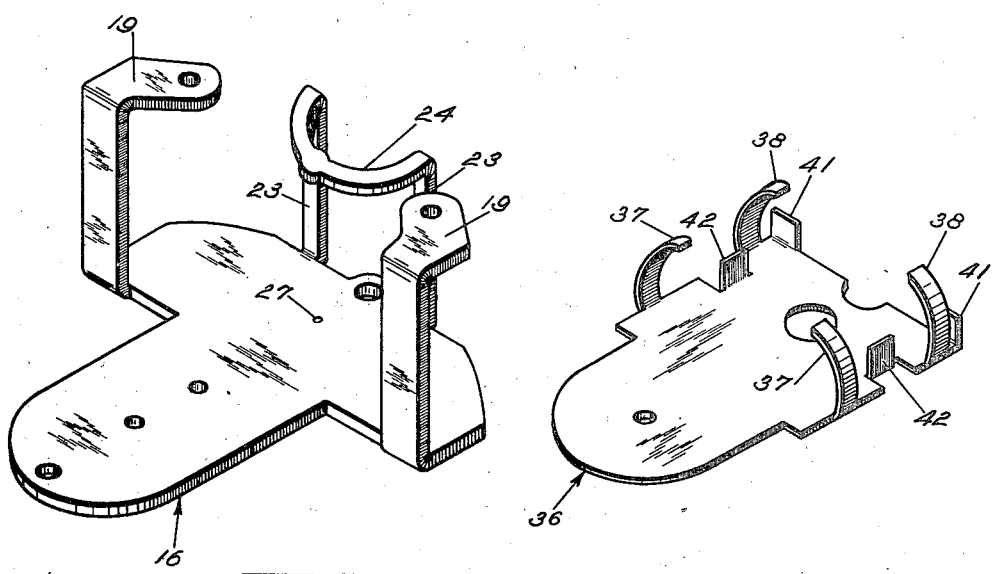
Inventors
Howard J. Hartley
Emerson Aschenbach
By  Strauch & Hoffman
        Attorneys Patented Sept. 24, 1935

2,015,474

UNITED STATES PATENT OFFICE 2,015,474

INDICATING INSTRUMENT

Howard J. Hartley, Lansdale, and Emerson Aschenbach, Sellersville, Pa., assignors to United States Gauge Company, New York, N. Y., a corporation of Pennsylvania Application May 3, 1934, Serial No. 723,750

12 Claims. (Cl. 171—95)

This invention relates to an electrical indicating instrument which is primarily designed to be used as a tell-tale device to indicate a condition existing at a remote point. The invention is adapted to be used in connection with a tank unit which has an electrical resistance varying substantially in accordance with the level of liquid in a tank or container. The invention is particularly adapted to be used as a liquid level gauge on an automobile.

In electrical indicating devices of this type the usual automobile battery is used as the source of electrical energy for the indicating system. Since the automobile battery is subjected to intermittent charges and discharges the resultant voltage fluctuation caused thereby, as well as the voltage variations, incidental to full charged and partially charged conditions of the battery, will produce an appreciable error in the reading of an indicating instrument of the common D'Arsonval type or similar instrument in which the resultant torque on the pointer system is proportional to the current flowing through the tank unit. To overcome this objection indicating instruments which are differentially wound have been used heretofore, and the present invention is concerned primarily with an improved instrument of this type.

The motor car manufacturer and public have become accustomed to and now demand that these indicating devices have certain features. One of these requirements is that the instrument be very compact and have the standard scale range of not less than 60 degrees, so that the dial readings can be sufficiently separated to facilitate reading thereof. In a differentially wound instrument, which meets the above requirements, difficulty has been experienced in designing an instrument with such a large scale range and yet keeping the armature under the correct relative influence of the energizing coils at all times so that the magnetic damping action on the armature will be substantially the same for all armature positions and so that the scale will be uniform from end to end.

Accordingly, it is a major object of this invention to provide an indicating instrument of the type described which will overcome the above mentioned difficulties.

Also such an instrument must be provided with means for easily adjusting the movement of the pointer relative to the scale. Therefore it is another object of this invention to provide an instrument with such adjusting means.

An instrument, having the above features must be also characterized by cheapness of manufacture. Accordingly, another major object of this invention is to provide an electrical indicating instrument which will be very cheap to manufacture and yet will be sensitive, efficient and reliable in operation.

Another object of this invention is to provide an electrical indicating device in which the calibration of the scale reading may very readily be changed at will to compensate for undersirable characteristics of the system.

A still further object of this invention is to provide an electrical indicating device which will have a minimum of parts, and which will be very easy to assemble.

It is also an object of this invention to provide an electrical indicating device having a plurality of energizing coils that are co-axially aligned whereby these coils may be easily assembled. It is still a further object of this invention to provide an electrical indicating device having a plurality of axially aligned coils in which an armature is adapted to rotate, and having an adjustable pole piece for varying the influence of one of said coils on said armature.

A further object of this invention is to provide an electrical indicating device having a stationary magnetic member, a portion of which is curved and arranged eccentrically to a movable armature whereby the device may be made to indicate in any desired relation with respect to the variations of the electrical conditions of the instrument circuit.

It is a further object of this invention to provide an electrical indicating instrument in which means are provided to vary the torsional period of the pointer system and to vary the force on the pointer system tending to urge the pointer back to zero position from any position other than zero.

Other and further objects will appear as the description proceeds.

This invention resides in the various parts, arrangements and combination of parts shown in the accompanying drawings in which:

Figure 1 is a sectional view of a completely assembled indicating instrument made in accordance with this invention, the section being taken, so far as can be indicated in Figure 2, along the plane of line 1—1.

Figure 2 is a face view, in partial section of the internal parts of Figure 1 as seen when looking upon the plane of the line 2—2 of Figure 1. The pointer system is shown in approximately maximum indicating position.

Figure 3 is a bottom view of the indicating instrument of Figure 1 with the outer case and dial removed.

Figure 4 is a perspective view of the parts of Figure 3 as seen when looking toward the top of the latter.

Figure 5 is a perspective view of the main frame removed from Figure 4 and viewed from the same angle.

Figure 6 is a perspective view of the coil holder, removed from Figure 4 and viewed from the same angle.

Figure 7 is a perspective view of the pointer and armature assembly, taken from a different point for clarity of illustration.

Figure 8 is a schematic diagram of an electrical circuit in which my indicating instrument is adapted to be used.

Referring to the drawings, the indicating instrument has a cup-shaped metallic case 10, over the open end of which a transparent face 11 is held in any suitable manner. An insulating plate 12 is secured to the casing 10 by means of bolts 13a and 13b which also serve as electrical conductors for one side of the electrical circuits which energize the instrument coils and are insulated from the casing by means of insulating bushings 14 which extend through the casing 10 around the bolts 13.

The main frame 16 of the instrument is secured to the insulating plate 12 by means of two eyelet rivets 17. A dial face plate 18 is secured to brackets 19, which are integral extensions of the main frame 16, by means of screws 21. An annular member 22, suitably secured to dial plate 18, carries the numerical readings of the instrument.

Upstanding legs 23, integral with the frame 16, are joined at their ends by means of an arcuate member 24 which carries the outer pivot bearing 25 of pointer shaft 26. The inner end of pointer shaft 26 is pivoted in the main frame 16 at 27. A pointer 28, shown in dot dash lines in Figure 1, is secured to the pointer shaft 26 and comprises a portion 28a which engages the shaft 26 at right angles, a portion 28b formed at right angles to the portion 28a, and terminates in the portion 28c, which is parallel to the dial face. The portion 28b extends through an arcuate slot 29 in the dial face plate 18.

An L-shaped armature 31, shown in Figure 3 in a position corresponding to maximum indicating position of the pointer system, comprising two integral arms 31a and 31b, which are made of soft iron, is secured to the shaft 26. Members 32 are carried by the pointer shaft 26 and are held in adjusted position by friction between themselves and washers 35a and 35b which frictionally engage the pointer shaft 26. The position of the members 32 may be easily adjusted relative to the pointer shaft to vary the center of gravity of the pointer system with respect to the pivot points of shaft 26. These members are usually adjusted relative to each other and to the armature and pointer so that the pointer is always urged toward zero from any other position. By changing the relative positions of the members with respect to each other, the weight of one may be made to more or less counterbalance the weight of the other, whereby the unbalanced force tending to return the pointer to zero from any other position is readily adjustable and this adjustment may be utilized to change the indicating characteristics of the instrument. The members 32 may carry solder or any other suitable soft metal or material which can be easily scraped or cut away to change the weight thereof, thereby changing the weight of the system. By changing the weight of the pointer system and the center of gravity with respect to the pointer shaft the torsional period of the system may be changed to minimize the effect of impacts and vibrations of various frequencies on the pointer.

Coaxially aligned coils 33 and 34 are secured to a coil member 36 by means of fingers 37 and 38, respectively. The member 36 is secured to the frame 16 by means of a screw 39 and a washer 40 and is positioned at the lower end by means of integral lugs 41, shown in Figure 6, which engage the legs 23 of frame 16. The coils are so positioned that their axes are parallel and lie in the same plane with the movable armature 31 of the pointer system, one being located on either side of the pointer shaft 26 so that each acts upon said armature when they are energized. The coils are spaced by means of lugs 42 on the member 36.

A soft iron pole piece 43 is adjustably secured to the frame 16 by means of the screw 39 and washer 40 and is spaced therefrom by means of a spacing washer 40'. The pole piece 43 is positioned in the same plane with and is movable toward and away from the armature 31 by means of a slot 45 in its upper end adapted to engage the screw 39. The pole piece 43 is also angularly adjustable about the screw 39. By adjusting the pole piece 43 toward the movable armature 31 the maximum scale reading may be increased for a given amount of current flowing through the indicating instrument and vice versa. A similar result may be obtained by moving the pole piece 43 angularly about the screw 39 or, by a combination of the two adjustments a further modified result may be obtained.

A feature of this invention is the structure and arrangement of the pole piece 43. The lower end of this pole piece terminates in an arcuate portion 44 which is eccentric to the armature 31. An instrument having a desired indicating characteristic can be obtained by providing it with a pole piece, the arcuate portion 44 of which has been predetermined. For example, if it is desired to produce an instrument in which the pointer should rotate more per increment of change of current flowing through the energizing coils as the armature moves from the zero position, the pole piece would be so shaped that the air gap between the portion 44 and the armature 31 would decrease as the armature moved away from zero position. This will readily be apparent from an inspection of Figure 2, where the pointer system is shown in approximately maximum position. The portion 44 would then have a general shape as shown in Figure 2. The characteristic of each instrument having a predetermined shape of pole piece can be further changed by varying the angular relation of the pole piece or the axial disposition thereof as stated above. It is to be understood that the pole piece 43 may have the portion 44 concentric with the armature 31 or may even have an eccentricity such that the air gap between the pole piece and armature is smaller near zero positions of the armature and pointer than for positions removed from zero depending upon the characteristic of the instrument desired. In an instrument having a pole piece designed to give a predetermined indication characteristic, the maximum pointer deflection can be determined by moving the pole piece axially and maintaining its angular disposition constant.

The electrical connections to the coils of the indicating instrument are made through flexible conductors to the brass bolts 13a and 13b and through the frame 16 and casing 10. A metallic strap conductor 46 engaged by the bolt 13a has flexible conductors 47 and 48 connecting it to one side of each of coils 33 and 34, respectively. A second metallic strap conductor 49 engaging the other bolt 13b is connected to the other side of coil 33 through a flexible lead 51. The remaining end of coil 34 is connected through a flexible conductor 52 to the frame 16. The frame 16 has a bronze ribbon connector 53 soldered to its upper end at 54. The ribbon connector is adapted to make contact with the casing 10 as at 56 when the meter is assembled as shown in Figure 1.

Referring to Figure 8, the two coils 33 and 34 are energized by means of a battery 60 which may be the usual lighting and ignition battery of the vehicle electrical system. One side of the battery 60 is adapted to be connected to the frame of the vehicle, indicated conventionally as a ground at 62, through a conductor 63. A switch 64, which is preferably the ignition switch of the vehicle motor, is interposed in the conductor 66, connected between the opposite side of the battery and the flexible conductors 47 and 48 of the coils 33 and 34, respectively. The circuit of coil 34 is completed through flexible conductor 52 which is connected to the instrument frame and casing. The instrument casing is in turn grounded to the vehicle frame conventionally indicated at 62. The circuit of the coil 33 is completed through the conductor 51, an extension 65 thereof, a rheostat 67 and a conductor 68 to ground 62. A rheostat 67 is part of a tank unit adapted to be operated by changes in the level of liquid in the fuel tank, and comprises a resistor 69, preferably wound on any suitable form and slidably contacted by a contact arm 71. The contact arm 71 is mounted on a shaft 72 carrying a pinion 73 adapted to mesh with a gear 74. The gear 74 is adapted to be rotated in accordance with changes in the level of fuel in a fuel tank (not shown) through an arm 76 on which a float 77 is carried.

The resistor 69 of the rheostat 67 may be of any convenient or desired size or shape. As shown by the patent to Dürr, Number 1,146,486, dated July 13, 1915, the resistance may be tapered so that the instrument will indicate proportionately to the state of change of a particular factor in which there is not a physical change directly proportional to such change of state. Such may be the case in automobile liquid level indicators, where the pointer position may not vary accurately in true relation to the changes in volume.

The differentially energized coils 33 and 34 are so located relative to each other that there is a minimum of flux interference and at the same time there is sufficient flux linking the armature 31 that it will always be responsive to the resultant of flux produced by the coils. It is desirable to have a maximum of flux linking the armature at all times so that the pointer system will be highly damped and will therefore reduce to a minimum the effect of the vibration of the automobile on the pointer system. Two coils are necessary in this type of instrument in order to produce an instrument which will indicate independently of the change of battery voltage. The two coils are so connected that the flux produced by coil 33 exerts a force tending to produce a clockwise rotation of the armature 31 and the flux produced by coil 34 exerts a force tending to produce counter-clockwise rotation of the armature. Therefore, the armature is responsive to the resultant force exerted by the coils. It will be obvious to those skilled in the art that should the voltage across both coils vary simultaneously the resultant change of the force exerted on armature 31 would be zero.

The operation of the device described above is as follows:

When the switch 64 is closed the coils 33 and 34 are energized. The armature 31 on the pointer system is so positioned that with the lower coil 34 energized and the upper coil 33 open circuited or having the total value of resistance 69 in series with it, the pointer will remain in the zero position to which it is normally counterbalanced by the members 32 as explained above. When the pointer is in the zero position shown in Figure 8, the arm 31b of the armature 31 is located well within the lower coil 34 and the arm 31a is just entering the coil 33. As the resistance 69 is cut out in response to movements of the contact arm 71, produced by changes of level of this liquid acting on the float 77, the flux set up by coil 33 overcomes the force produced on the armature 31 by the lower coil 34 and the pointer is caused to rotate in a clockwise direction. As the upper leg 31a is rotated in a clockwise direction, the air gap between the pole piece 43 and the armature 31 is reduced and the arm 31b is farther removed from the influence of the coil 34 causing the pointer to move farther for a corresponding change in resistance 69 than when the pointer is nearer the zero position.

As the axis of the arm 31a approaches the axis of the pole piece 43 the force exerted on the armature by coil 33 decreases so that an increase in current through coil 33 produces a smaller resultant force on the armature and consequently a smaller movement of the pointer 28 per unit of current change in coil 33. By providing the indicating instrument with a pole piece 43 having a portion 44 of a predetermined eccentricity the pointer can be made to indicate in any desired relation with respect to the change in energization of coils 33 and 34 and by moving the pole-piece toward and away from the armature 31 the maximum scale range may be varied as explained above.

From the above description it will be apparent that according to this invention an inexpensive instrument is provided which is particularly suited to any remote indicating system in which it is desired to produce an indication in accordance with a predetermined condition.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a remote indicating device, an electrical indicating instrument, comprising a plurality of axially aligned coils, an indicator system associated with said coils, including an armature, means for constantly energizing one of said coils, means for variably energizing another of said coils whereby the energization of said last mentioned coil variably opposes the effect of the energization of said first coil on said armature, and a magnetic member disposed adjacent said armature and within the field of the opposing coil.

2. In a remote indicating system, an electrical instrument adapted to indicate in accordance with a predetermined condition, a plurality of coaxial aligned coils, an indicator adapted to be influenced by said coils, means for constantly energizing one of said coils from a source of electrical energy, means for variably energizing another of said coils from said source in response to said predetermined condition, a pole piece associated with the variably energized coil, and means for adjusting said pole piece both linearly and angularly with respect to said variably energized coil.

3. In an electrical indicating instrument, comprising a main frame, integral legs extending from the body of said frame, said legs terminating in an arch joining said legs, said arch having its plane parallel to said main frame, a pointer system pivoted between said arch and said frame, said pointer system including an armature, a plurality of axially aligned coils adapted to influence said armature, a member having a plurality of fingers adapted to engage said coils, a stationary pole piece arranged in the same plane with said armature, and common means for securing said pole piece and said member to said frame.

4. In an electrical indicating instrument, a plurality of axially aligned coils, a pointer system having an armature adapted to rotate within said coils, means for energizing said coils to produce magnetic lines of force to influence said armature, said armature having a plurality of arms arranged at an angle to each other whereby the influence of one of said coils on said armature decreases as the influence of the other coil increases.

5. In an electrical indicating instrument; a plurality of axially aligned coils, a pointer system having an armature adapted to rotate within said coils, means for continuously energizing one of said coils to produce magnetic lines of force to influence said armature, means to variably energize another of said coils to oppose the influence of said continuously energized coil, said armature having a plurality of arms arranged at an angle to each other, whereby said continuously energized coil exerts a greater influence on said armature at the zero position of said pointer system and said variably energized coil exerts a greater influence on said armature at the full position of said pointer system.

6. In an electrical indicating instrument, a plurality of axially aligned coils, a pointer system having an armature adapted to rotate within said coils, means for continuously energizing one of said coils to magnetically influence said armature, means to variably energize another of said coils to oppose the influence of said continuously energized coil on said armature said armature having a plurality of arms arranged at an angle to each other, whereby the influence of said continuously energized coil on said armature decreases as the influence of the other coil increases, and means associated with said armature and said variably energized coil to decrease the reluctance of the magnetic circuit of said variably energized coil.

7. In an electrical indicating instrument, two coaxially aligned coils, a pointer system having an armature, means for energizing one of said coils to produce a substantially constant magnetic intensity adapted to influence said armature, means for variably energizing the other of said coils to oppose the influence of said first coil on said armature, and means associated with said armature for increasing the opposing influence at a greater rate than the increase in energization of said variably energized coil.

8. In an electrical indicating instrument, a plurality of coaxially aligned coils, a pointer system having an armature responsive to the energization of said coils, a magnetic member adjustably secured in the field of only one of said coils having a portion terminating adjacent said armature and eccentric thereto.

9. In an electrical indicating instrument, the combination of a pair of air coils, an armature rotatable within the air cores of said coils, a stationary pole piece adjustably secured in the same plane with said armature and in offset relation to said coils, said pole piece having a portion projecting toward said coils adjacent said armature and eccentric thereto to control the action of one of said coils upon said armature.

10. In an electrical indicating instrument, a set of closely associated coils, an indicator system having an armature that is of irregular shape and rotatable within the fields of said coils, an adjustable pole piece arranged in the same plane with said armature, said pole piece terminating adjacent said armature in a portion which is curved about the axis of said armature but which is eccentric to said axis.

11. In an electrical indicating instrument, a pair of substantially aligned coils wound and arranged in opposition; an armature constantly under the influence of both of said coils when the latter are energized; a pole piece disposed in the field of only one of said coils and designed to vary the influence of said one coil upon the armature during operation; and indicating means operable by said armature.

12. In an electrical instrument of the general character of that described, a set of closely associated coils; an armature under the influence of said coils when the latter are energized; and a linearly and angularly adjustable magnetic member for controlling the influence of said coils upon said armature.

HOWARD J. HARTLEY.
EMERSON ASCHENBACH.